United States Patent
Capps, Jr. et al.

(10) Patent No.: US 8,495,342 B2
(45) Date of Patent: Jul. 23, 2013

(54) CONFIGURING PLURAL CORES TO PERFORM AN INSTRUCTION HAVING A MULTI-CORE CHARACTERISTIC

(75) Inventors: Louis B. Capps, Jr., Georgetown, TX (US); Michael J. Shapiro, Austin, TX (US); Robert H. Bell, Jr., Austin, TX (US); Thomas E. Cook, Essex Junction, VT (US); William E. Burky, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 12/335,921

(22) Filed: Dec. 16, 2008

(65) Prior Publication Data

US 2010/0153700 A1   Jun. 17, 2010

(51) Int. Cl.
    *G06F 9/30*  (2006.01)
(52) U.S. Cl.
    USPC .............................................. 712/222; 712/7
(58) Field of Classification Search
    USPC ........................................................ 712/222
    See application file for complete search history.

(56) References Cited

U.S. PATENT DOCUMENTS

| | | | |
|---|---|---|---|
| 4,720,809 A * | 1/1988 | Taylor | 708/512 |
| 5,860,024 A | 1/1999 | Kyle et al. | |
| 6,584,528 B1 | 6/2003 | Kurafuji et al. | |
| 6,615,366 B1 | 9/2003 | Grochowski et al. | |
| 6,950,954 B1 | 9/2005 | Sullam et al. | |
| 7,080,267 B2 | 7/2006 | Gary et al. | |
| 7,268,570 B1 | 9/2007 | Audet et al. | |
| 7,631,171 B2 * | 12/2009 | Bonebakker et al. | 712/227 |
| 2004/0128598 A1 | 7/2004 | Chung et al. | |
| 2005/0251700 A1 | 11/2005 | Henderson et al. | |
| 2006/0136606 A1 | 6/2006 | Guzy et al. | |
| 2006/0143390 A1 | 6/2006 | Kottapalli | |
| 2007/0143574 A1 * | 6/2007 | Bonebakker et al. | 712/2 |
| 2007/0226735 A1 * | 9/2007 | Nguyen et al. | 718/1 |

FOREIGN PATENT DOCUMENTS

| | | | |
|---|---|---|---|
| JP | 2008084009 A | 4/2008 | |
| KR | 20040091538 A | 10/2004 | |

OTHER PUBLICATIONS

English Abstract of KR20040091538A, published on Oct. 28, 2004, International Business Machines Corporation.
English Abstract of JP2008084009A, published on Apr. 10, 2008, Toshiba Corp.

* cited by examiner

*Primary Examiner* — Keith Vicary
(74) *Attorney, Agent, or Firm* — Hamilton & Terrile, LLP; Robert W. Holland

(57) ABSTRACT

A processor having multiple cores coordinates functions performed on the cores to automatically, dynamically and repeatedly reconfigure the cores for optimal performance based on characteristics of currently executing software. A core running a thread detects a multi-core characteristic of the thread and assigns one or more other cores to the thread to dynamically combine the cores into what functionally amounts to a common core for more efficient execution of the thread.

20 Claims, 3 Drawing Sheets

CONFIGURING PLURAL CORES TO PERFORM AN INSTRUCTION HAVING A MULTI-CORE CHARACTERISTIC

BACKGROUND OF THE INVENTION

Description of the Related Art

Microprocessors for general-purpose workloads, such as those found in servers and in workstations, are designed to balance workload expected at the server or workstation. This often means that trade-offs are made for performing workloads that use one type of operation more than another, such as floating point intensive or integer intensive operations. The tradeoff typically entails designing in more circuits that are specialized for performing expected operations and less circuits that are specialized for less frequently expected operations. Caches are designed to hold critical sections of the workload known as working sets, without increasing the thermal and cost parameters for the processor. Processors designed to perform generalized operations work well for a variety of workloads but are not optimal for any one specific task.

Task-specific processors, such as a digital signal processor device (DSPs), can exceed by many times the performance of general-purpose processors when executing their specialized workloads. However, when a DSP tuned for a specific workload encounters any other workload with even slightly varied characteristics, the DSP tends to run poorly.

Today's general purpose processors are often designed around benchmarks purported to represent the most likely workloads for designed operations. However, if a general-purpose processor is placed in an operational environment that tends to perform more of one operation than another, the operational efficiency will suffer. Similarly, if a specialized processor is placed in an operational environment that differs from its specialized environment, operational efficiency will suffer. The current state for processor design does not allow processors to adapt to workloads dynamically by reconfiguring themselves to match the characteristics of the currently executing software instructions.

SUMMARY OF THE INVENTION

In accordance with the present disclosure, functions performed by a processor are dynamically adapted to an operational environment by re-configuring the processor so that functions performed by the processor are performed with greater efficiency. A core executing instructions having a multi-core characteristic assigns other cores to aid with the instructions so that the plural cores act as a common core. This approach allows multiple workloads to run more efficiently since cores are re-configured to match processing needs. Overall design complexity of a multi-core system is reduced by the use of simple cores available for dynamic assignment to perform complex operations instead of a larger and more complex single core.

BRIEF DESCRIPTION OF THE DRAWINGS

The present disclosure may be better understood, and its numerous objects, features, and advantages made apparent to those skilled in the art by referencing the accompanying drawings. The use of the same reference number throughout the several figures designates a like or similar element.

DETAILED DESCRIPTION

This disclosure describes a method and apparatus for automatically, dynamically, and repeatedly reconfiguring a processor for optimal performance based on characteristics of currently executing software. Plural cores of a processor are dynamically combined into larger cores that run complex operations with improved efficiency. Plural cores of an integrated circuit are selectively combined into functional groups by high speed communication paths between the cores of a functional group so that a first core manages secondary cores that help perform a workload. The first core takes over secondary cores to create a combination of cores that functions as a single core so that complex functions are executed on the combination of cores in fewer cycles than would be used for a single core. Complex workloads are effectively managed with simple cores to provide efficient processing with a simplified processor design.

Figure 1:
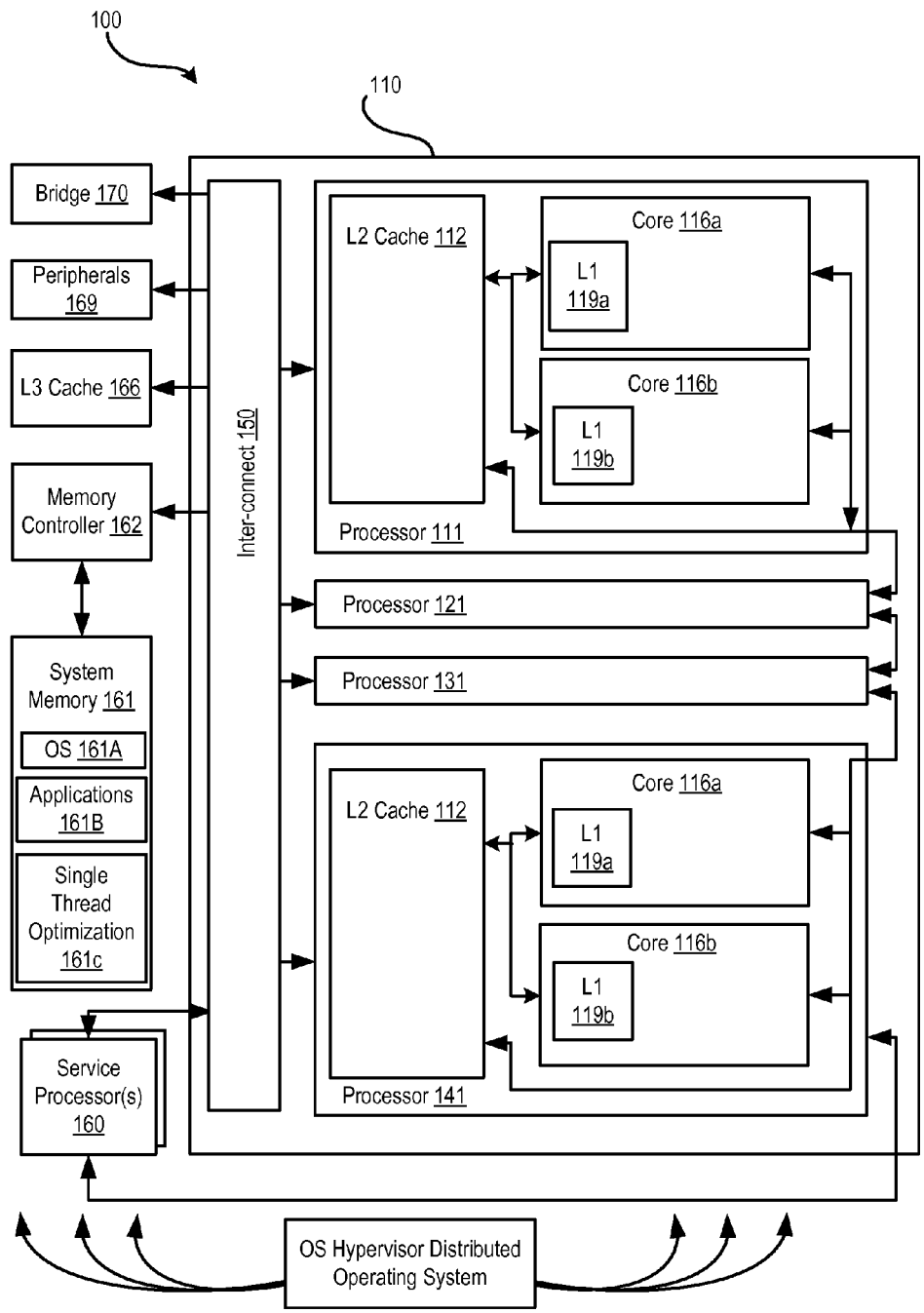
FIG. 1 shows a multi-processor computer architecture in which selected embodiments of the present disclosure may be implemented.

Referring now to FIG. 1, there is illustrated a high-level block diagram of a multiprocessor (MP) data processing system 100 that provides improved execution of single thread programs in accordance with selected embodiments of the present disclosure. The data processing system 100 has one or more processing units arranged in one or more processor groups, and as depicted, includes four processing units 111, 121, 131, 141 in processor group 110. In a symmetric multi-processor (SMP) embodiment, all of the processing units 111, 121, 131, 141 are generally identical, that is, they all use a common set or subset of instructions and protocols to operate, and generally have the same architecture. As shown with processing unit 111, each processing unit may include one or more processor cores 116a, 116b which carry out program instructions in order to operate the computer. An exemplary processing unit would be the POWER5™ processor marketed by International Business Machines Corporation that comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

As further depicted in FIG. 1, each processor core 116a, 116b includes an on-board (L1) cache memory 119a, 119b (typically, separate instruction and data caches) that is constructed from high-speed memory devices. Caches are commonly used to temporarily store values that might be repeatedly accessed by a processor, in order to speed up processing by avoiding the longer step of loading the values from system memory 161. A processing unit can include another cache such as a second level (L2) cache 112 which, along with a cache memory controller (not shown), supports both of the L1 caches 119a, 119b that are respectively part of cores 116a and 116b. Additional cache levels may be provided, such as an L3 cache 166 which is accessible via fabric bus 150. Each cache level, from highest (L1) to lowest (L3) can successively store more information, but at a longer access penalty. For example, the on-board L1 caches (e.g., 119a) in the processor cores (e.g., 116a) might have a storage capacity of 128 kilobytes of memory, L2 cache 112 might have a storage capacity of 4 megabytes, and L3 cache 166 might have a storage capacity of 132 megabytes. To facilitate repair/replacement of defective processing unit components, each processing unit 111, 121, 131, 141 may be constructed in the form of a replaceable circuit board, pluggable module, or similar field replaceable unit (FRU), which can be easily swapped, installed in, or swapped out of system 100 in a modular fashion.

The processing units communicate with other components of system 100 via a system interconnect or fabric bus 150. Fabric bus 150 is connected to one or more service processors 160, a system memory device 161, a memory controller 162, a shared or L3 system cache 166, and/or various peripheral devices 169. A processor bridge 170 can optionally be used to interconnect additional processor groups. Though not shown, it will be understood that the data processing system 100 may also include firmware which stores the system's basic input/output logic, and seeks out and loads an operating system from one of the peripherals whenever the computer system is first turned on (booted).

As depicted in FIG. 1, the data processing system 100 includes multiple system resources (e.g., cache memories, memory controllers, interconnects, I/O controllers, etc) which are shared among multiple threads.

The system memory device 161 (random access memory or RAM) stores program instructions and operand data used by the processing units, in a volatile (temporary) state, including the operating system 161A and application programs 161B. Single thread optimization module 161C may be stored in the system memory in any desired form, such as an operating system module, Hypervisor component, etc, and is used to optimize the execution of a single threaded program across multiple cores of the processor units. Although illustrated, as a facility within system memory, those skilled in the art will appreciate that single thread optimization module 161C may alternatively be implemented within another component of data processing system 100. The single thread optimization module 161C is implemented as executable instructions, code and/or control logic including programmable registers which is operative to check performance monitor information for codes running on the system 100, to assign priority values to the code using predetermined policies, and to tag each instruction with its assigned priority value so that the priority value is distributed across the system 100 with the instruction, as described more fully below.

Figure 2:
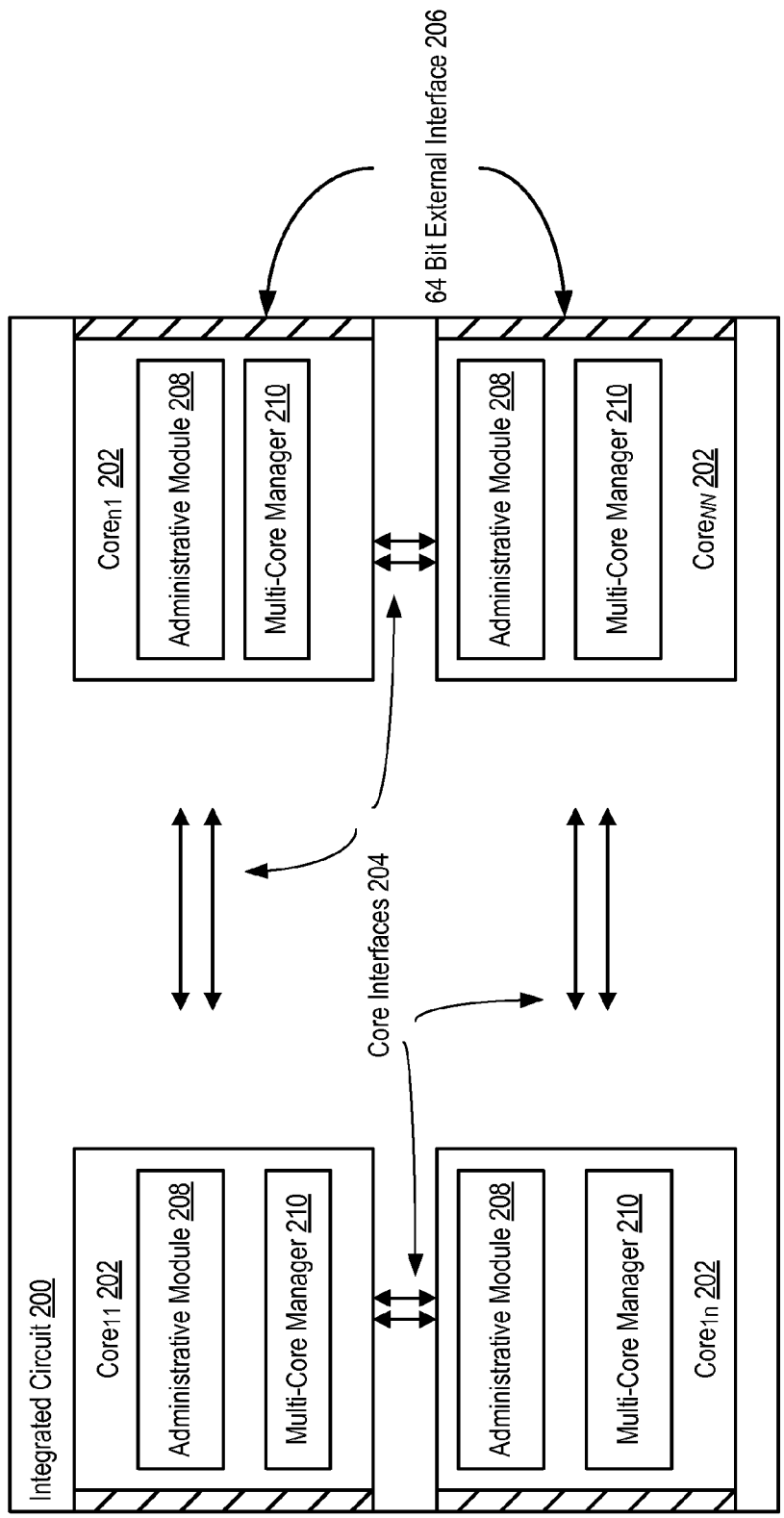
FIG. 2 shows a multi-core processor architecture in which selected embodiments of the present disclosure may be implemented.

Referring now to FIG. 2, a multi-core processor integrated circuit 200 is depicted with four cores 202 that cooperate to process information. The plural cores of integrated circuit 200 communicate through high-speed core interfaces 204 that are built into integrated circuit 200. In the embodiment depicted by FIG. 2, each of four cores 202 has a sixty-four bit external interface 206 that communicates with external devices along the edge of integrated circuit 200. In alternative embodiments, a greater number of cores 200 might be integrated on an integrated circuit 200 with external interfaces established along the lower or upper surface of integrated circuit 200. Each core 202 may be designed to perform a specialized function. For example, a core might specialize at performing integer functions, such as a core that is an integer vector unit, or a floating point function. In relative terms, each core 202 has a simplified design to reduce design complexity while combinations of cores 202 are used to perform relatively complex tasks as set forth below.

Multi-core processor integrated circuit 200 performs operations by selectively grouping cores 202 into combinations so that a group of cores act as a common unit communicating through interfaces 204 that operates effectively as a single core. A combination of cores 202 include two or more cores assigned to a thread with the number of assigned cores managed to perform the thread in an efficient manner. An administrative module 208 running on each core 202 monitors operations on that core 202 in order to identify operations to perform in combination with other cores 202. For example, during execution of a thread at a core 202, an administrative module 208 associated with the core 202 looks ahead at upcoming instructions of the thread to identify workloads that have one or more multi-core characteristics, such as complex instructions that are amenable to being split up for execution between two or more cores. If a multi-core characteristic is detected, administrative module 208 initiates a multi-core manager 210 to locate and assign one or more other cores 202 to combine for execution of the instructions. In the embodiment depicted by FIG. 2, administrative module 208 and multi-core manager 210 are distributed to each core 202, however, in alternative embodiments administration and management of multi-core combinations may be managed with more centralized logic in a separate portion of integrated circuit 200 or with various degrees of distribution of the logic through various cores 202. In the embodiment depicted by FIG. 2, the administrative module 208 in the first core 202 that identifies a multi-core characteristic assigns and manages secondary cores 202 to aid in execution of the instructions by communication with the administrative module 208 and multi-core manager 210 of the secondary cores. Secondary cores 202 are selected if in an idle state or if the operation has a priority based on the location of the primary core and type of function involved. For instance, a first core performing an integer function will select a secondary core specialized for integer functions that has adequate speed on the core interface 204 to perform the workload at hand.

Once a first of plural cores 202 assigns one or more secondary cores 202 to the instructions, the multi-core manager 210 of the secondary core 202 copies the current state of the first core 202 and begins speculative execution of the thread provided from the first core 202 in an attempt to synchronize instruction execution between the first and secondary core. When the cores 202 are synchronized, workload is shared between the cores 202 to accomplish the task in reduced time, such as a reduced number of cycles. For example, first and second cores 202 reach a common same instruction that is subject to vectorization. The instructions are then vectorized with the cores performing work on opposite sections of the thread data. When each core 202 completes its respective function, the results from each core are combined back to the first core to continue with the thread.

Figure 3:
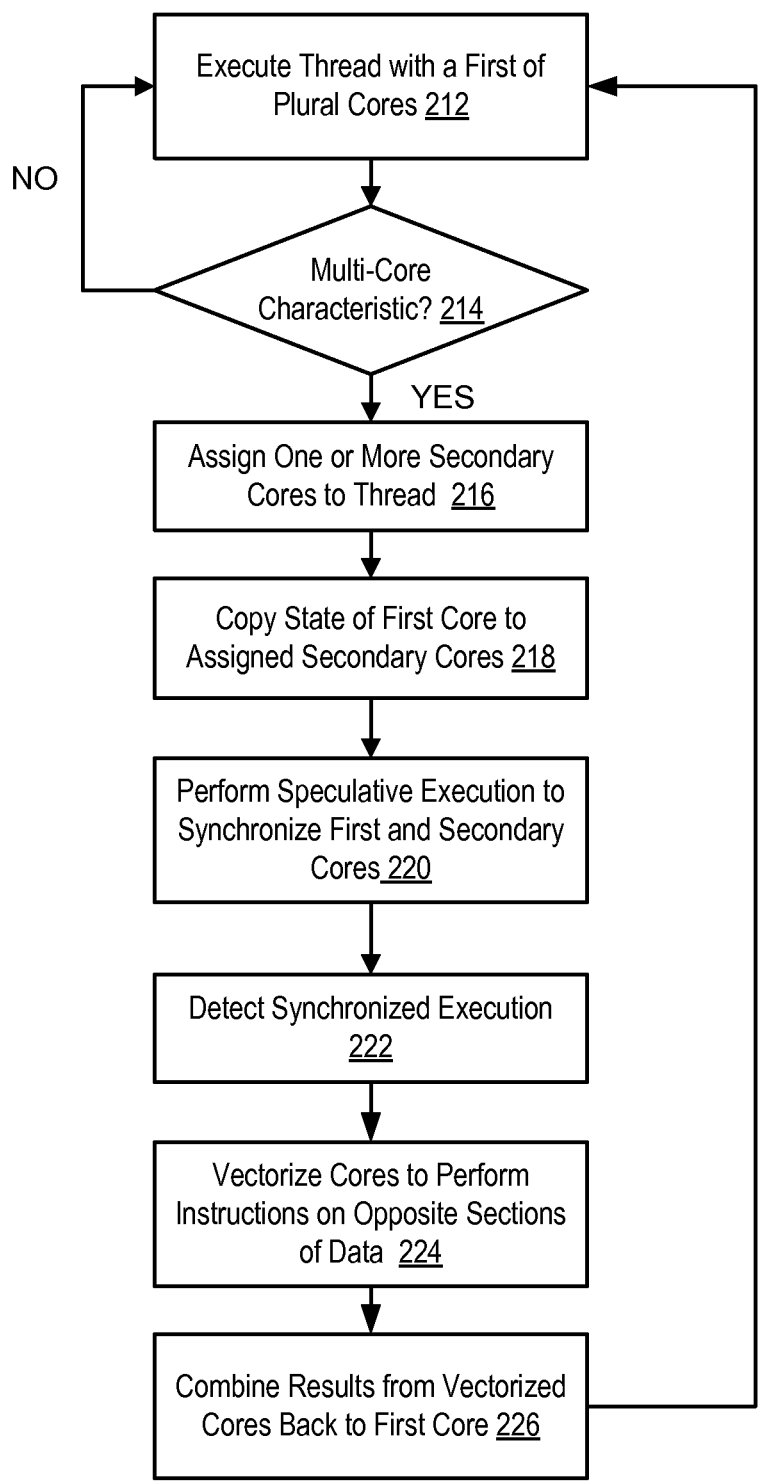
FIG. 3 shows a flow diagram of a process in which selected embodiments of the present disclosure may be implemented.

Referring now to FIG. 3, a flow diagram depicts an example of the assignment of plural cores to dynamically tie integer vector units together to create a larger vectorized unit. The process begins at step 212 with execution of a thread using a first of plural cores. During execution of the thread, instructions are examined at step 214 to detect one or more multi-core characteristics. If a multi-core characteristic is not detected, the process returns to step 212 to continue the thread instructions with a single core. If a multi-core characteristic is detected, the process continues to step 216 as described below. For purposes of the present example, a base core design has a vector unit composed of a single 64 bit unit while the instruction set and register set of the thread are designed around 128 bit data size. In this example, a single core vector unit can operate across the data in eight eight-bit operations, four sixteen-bit operations or two thirty-two bit operations or a single sixty-four bit operation. Thus, if the single core vector unit performs the thread without combining with other vector units, a minimum of two cycles would be needed to perform the operation on the 128 bit data size. In this instance, the administration module associated with the core identifies a multi-core characteristic because the instruction set and/or register set of the thread has a width of 128 bits, twice the width of the vector unit. In alternative embodiments, the number of vector units assigned to a thread is based on the number of multiples of the instruction set and/or register set width compared with the vector unit width. In alternative embodiments, other types of multi-core characteristics can be used as the basis for assigning multiple cores to a thread or instruction. For example, a compiler hint or indicator added to the code sequence may be used to help predict when a core can split a workload between plural cores.

Once a multi-core characteristic is detected at step 214, the process continues to step 216 to assign one or more secondary cores to the thread to aid in the operation by the first core. The secondary core or cores are assigned if they are free to perform the operation of if the operation has a greater priority than the operations associated with secondary cores. At step 218, the state of the first core is copied to the secondary cores, and, at step 220, the cores perform speculative execution to synchronize the first and secondary cores at a common instruction. At step 222, synchronized execution is detected so that, at step 224, the cores are vectorized to perform the instructions on opposite sections of the vector data. Using the example above, when a 128 bit instruction is executed with two vector unit cores, only one cycle is needed since each core operates on 64 bits of the data. Multiple vector operations in sequence continue to run on the separate cores until the data needs to be merged back to the first core. At step 226, the results are combined from the vectorized cores back to the first core upon completion of the operation and the process returns to step 212.

This disclosure provides a method and system for automatically, dynamically and repeatedly reconfiguring a processor for optimal performance based on an analysis of characteristics of currently executing instructions. Simple cores are dynamically combined into larger cores to more efficiently run complex instructions while keeping design complexity and cost of the processor reduced. Selective assignment by a managing core of other cores to an instruction set improves flexibility of performing instructions so that the processor more readily adapts to a wide variety of instruction sets.

Consequently, the disclosure is intended to be limited only by the spirit and scope of the appended claims, giving full cognizance to equivalents in all respects.

What is claimed is:

1. A method for re-configuration of a processor having plural cores, the method comprising:
    executing a thread having plural instructions at a first of the plural cores;
    detecting a predetermined multi-core characteristic of one or more of the instructions of the thread with logic operating on the processor while the thread is executing on the first core;
    re-configuring the processor to have plural cores perform the one or more instructions; and
    performing speculative execution of the thread at one or more of the plural cores to synchronize the one or more of the plural cores to an instruction at the first of the plural cores.

2. The method of claim 1 wherein the thread comprises a floating point function.

3. The method of claim 1 wherein the thread comprises an integer function.

4. The method of claim 3 wherein the plural cores comprise plural integer vector units and re-configuring the processor comprises tying plural integer vector units together to create a common vectorized unit operable to perform the integer function.

5. The method of claim 1 wherein detecting a predetermined multi-core characteristic comprises detecting an instruction set having a data size greater than a vector unit size of the first core.

6. The method of claim 5 wherein the detecting a predetermined multi-core characteristic comprises detecting a compiler-inserted indicator.

7. The method of claim 1 wherein re-configuring the processor to have plural cores perform the one or more instructions further comprises:
    assigning one or more secondary cores to perform the one or more instructions;
    copying an instruction state of the first core to the one or more secondary cores; and
    executing the one or more instructions with the first and the one or more secondary cores.

8. The method of claim 7 wherein executing the one or more instructions with the first and the one or more secondary cores further comprises:
    performing speculative execution of instructions at the one or more secondary cores to synchronize instruction execution to a common instruction executing at the first core;
    determining that the common instruction on the first and the one or more secondary cores is subject to vectorization;
    performing instructions for the vectorization on the first and the one or more secondary cores having one or more sections of data; and
    combining results from the performing at the first core.

9. A processor comprising:
    plural cores interfaced with each other, each core operable to execute a thread having plural instructions;
    an administrative module distributed to each of the plural cores, the administrative module operable to detect a multi-core characteristic of one or more of the plural instructions of the thread during execution of the thread on the first core by looking ahead at upcoming instructions; and
    a multi-core manager distributed to each of the plural cores and interfaced with the administrative module, the multi-core manager operable to re-configure the processor to have secondary of the plural cores execute the thread simultaneously with the first core in response to the detecting of the multi-core characteristic.

10. The processor of claim 9 wherein the thread comprises a floating point function.

11. The processor of claim 9 wherein the thread comprises an integer function.

12. The processor of claim 11 wherein the plural cores comprise plural integer vector units and wherein the multi-core manager re-configures the processor by tying plural integer vector units together to create a common vectorized unit operable to perform the integer function.

13. The processor of claim 9 wherein the multi-core characteristic comprises an instruction set having a data size greater than a vector unit size of the first core.

14. The processor of claim 9 wherein the multi-core characteristic comprises a compiler-inserted indicator.

15. The processor of claim 9 wherein the multi-core manager reconfigures the processor by:
   assigning one or more secondary cores to perform the thread;
   copying an instruction state of the first core to the one or more secondary cores; and
   executing the thread with the first and the one or more secondary cores.

16. The processor of claim 15 wherein executing the thread with the first and the one or more secondary cores further comprises:
   performing speculative execution of instructions to synchronize instruction execution;
   finding a common instruction on the first and the one or more secondary cores that is subject to vectorization;
   performing instructions on the first and the one or more secondary cores having one or more sections of data; and
   combining results from the performing at the first core.

17. A method for configuration of a processor having plural cores, the method comprising:
   detecting, during execution of a thread at a first core of the plural cores by examining upcoming instructions of the thread at the first core, that the thread has one or more instructions having an operational width greater than the width of the first core;
   assigning one or more secondary cores of the plural cores to run the one or more instructions in response to the detecting; and
   executing the one or more instructions on the first core and the one or more secondary cores of the plural cores; and
   combining results from the executing at the first core.

18. The method of claim 17 wherein the first core has a width of n bits and the one or more instructions have an operational width of n×m bits.

19. The method of claim 17 wherein the first and the one or more secondary cores comprise integer vector units and executing the one or more instructions on the first core and the one or more secondary cores of the plural cores comprises running multiple vector operations.

20. The method of claim 17 wherein executing the one or more instructions on the first core and the one or more secondary cores of the plural cores further comprises:
   copying an execution state of the first core to the one or more secondary cores; and
   performing speculative execution to synchronize the one or more secondary cores to the first core.

\* \* \* \* \*